(12) United States Patent
Kakinoki (10) Patent No.: US 6,766,959 B2
(45) Date of Patent: Jul. 27, 2004

(54) INFORMATION CARD AND CARD SHAPED CASING THEREFOR

(75) Inventor: Wataru Kakinoki, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 127 days.

(21) Appl. No.: 09/795,226

(22) Filed: Feb. 28, 2001

(65) Prior Publication Data

US 2001/0025888 A1 Oct. 4, 2001

(30) Foreign Application Priority Data

Feb. 29, 2000 (JP) ........................................ 2000-053840

(51) Int. Cl.⁷ .............................................. G06K 19/06
(52) U.S. Cl. ....................................... 235/492; 235/441
(58) Field of Search .............................. 235/492, 441, 235/385; 361/728, 736, 737, 799, 800, 814, 816

(56) References Cited

U.S. PATENT DOCUMENTS

| | | | | |
|---|---|---|---|---|
| 5,330,360 A | * | 7/1994 | Marsh et al. | ............... 439/76.1 |
| 5,510,959 A | * | 4/1996 | Derstine et al. | ............ 361/816 |
| 6,121,544 A | * | 9/2000 | Petsinger | .................. 174/35 R |
| 6,166,324 A | * | 12/2000 | Oldendorf et al. | ........ 174/35 R |
| 6,320,252 B1 | * | 11/2001 | Potters et al. | ............... 257/679 |
| 6,417,444 B1 | * | 7/2002 | Hirai et al. | ............... 174/35 R |

FOREIGN PATENT DOCUMENTS

| | | |
|---|---|---|
| JP | 59-53468 | 4/1984 |
| JP | 1-156071 | 10/1989 |
| JP | 2-80481 | 6/1990 |
| JP | 3-159798 | 7/1991 |
| JP | 4-107191 | 4/1992 |
| JP | 06-320892 | 11/1994 |
| JP | 7-302318 | 11/1995 |
| JP | 11-175680 | 7/1999 |
| JP | 2000-10687 | 1/2000 |
| JP | 2000-306069 | 11/2000 |

* cited by examiner

Primary Examiner—Michael G. Lee
Assistant Examiner—Kimberly D. Nguyen
(74) Attorney, Agent, or Firm—Keating & Bennett, LLP (57) ABSTRACT

A card shaped casing includes a member having a construction such that a front panel or a back panel are unitarily formed. This member, for example, a back-panel combined frame, is constructed of a resin, etc. Accordingly, the number of expensive metal panels having adhesive layers and insulating layers, which are necessary for forming the casing, is reduced.

19 Claims, 6 Drawing Sheets

INFORMATION CARD AND CARD SHAPED CASING THEREFOR

BACKGROUND OF THE INVENTION

1. Field of the Invention

The present invention relates to an information card, which is typically, but not exclusively, a PC card, and to a card shaped casing for such an information card.

2. Description of the Related Art

Conventionally, information cards are commonly used for adding new functions or increasing functionality of information processing devices such as personal computers (PC), personal digital assistants (PDAs) and other communication devices. The information cards are constructed by installing various electronic components and electronic circuits in a card shaped casing. With regard to the information cards for PCs, PC cards that adhere to standards according to the Personal Computer Memory Card International Association (PCMCIA) or the Japan Electronic Industry Development Association (JEIDA) are generally used. There are two types of PC cards including a first type for 16 bit bus width, and a second type which follows the CardBus standards, is for 32 bit bus width. Although the two types of PC cards differ from each other with respect to, for example, whether or not they require ground plates, or other features, the constructions thereof are basically the same. The basic construction of a conventional PC card is shown in FIGS. 5 and 6.

Figure 5:
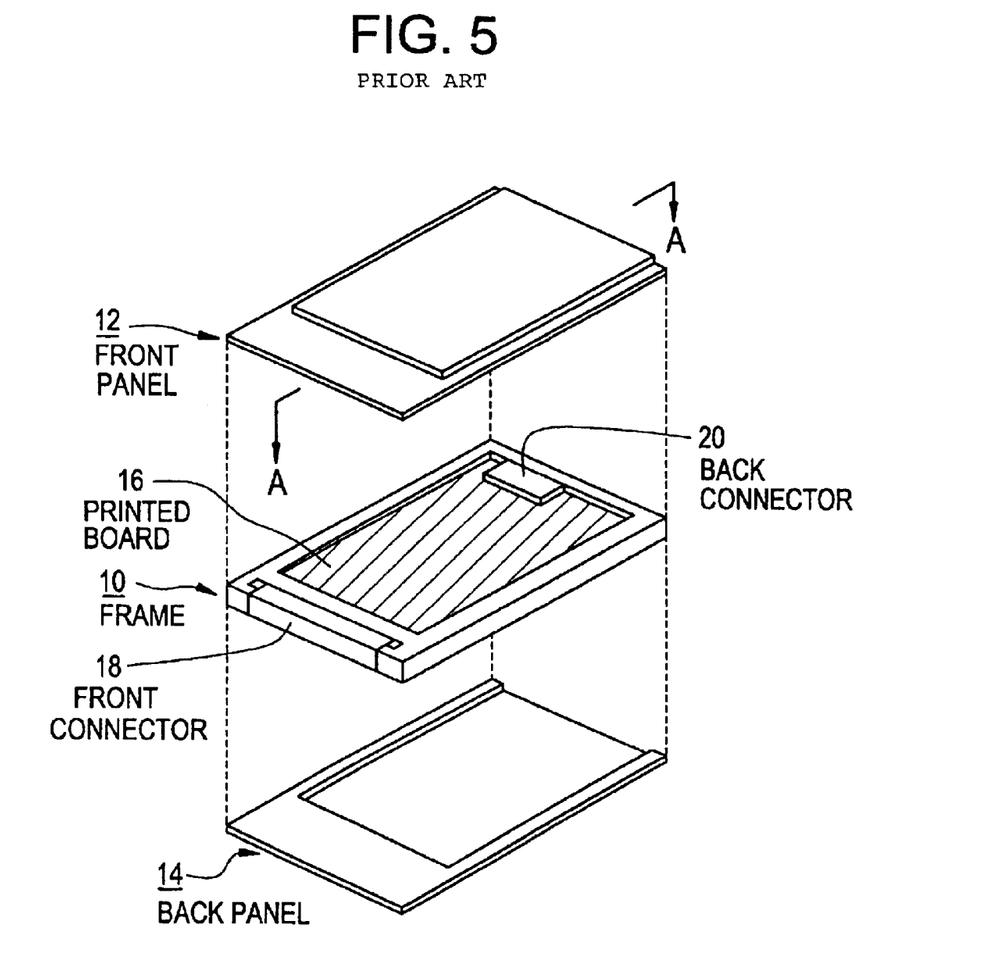
FIG. 5 is an exploded perspective view of a PC card according to a conventional technique.
Figure 6:
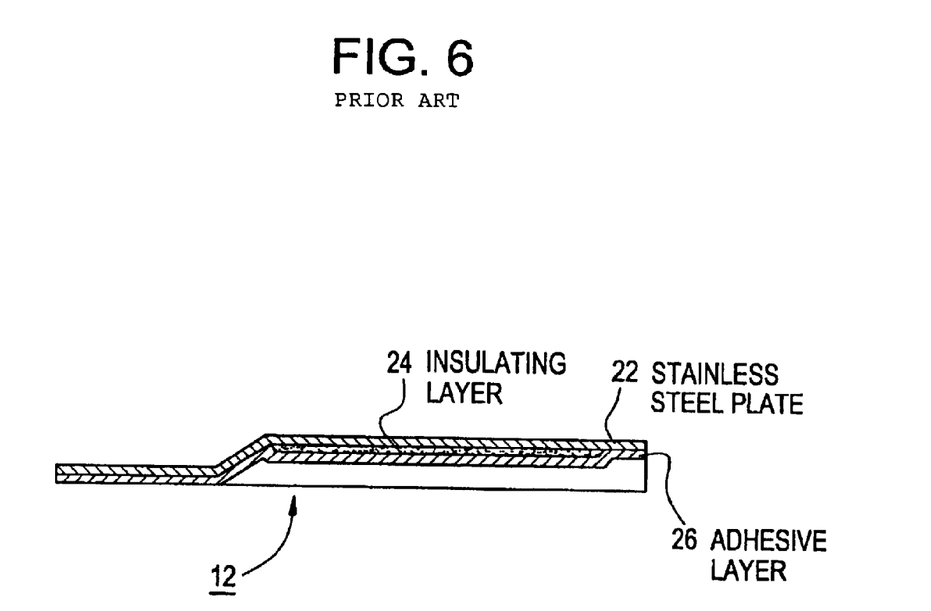
FIG. 6 is a sectional view showing a construction of a metal panel.

With reference to FIG. 5, a PC card includes a rectangular and flat frame 10, a front panel 12, and a back panel 14. The frame 10 is generally constructed of a resin, and the front panel 12 and the back panel 14 are generally constructed of metal plates. Various electronic components and electronic circuits (printed patterns) are mounted or formed on a printed board 16, which is disposed in a space surrounded by the frame 10, the front panel 12, and back panel 14. The frame 10 defines the side surfaces of this space, and the front panel 12 and the back panel 14 defines the front and the back surfaces of this space. The electronic components and the electronic circuits on the printed board 16 are connected to an external device via a front connector 18 or via a back connector 20 provided in the frame 10. The front connector 18 is disposed at one end of the PC card that is first inserted into a card-receiving slot, and the back connector 20 is disposed at the other end of the PC card. For example, with respect to memory cards, memory cells and memory circuits provided on the printed board 16 are connected to devices inside personal computers via the front connector 18. In this case, the back connector 20 may be omitted. With respect to modem cards, LAN cards, and other types of cards, the front connector 18 is required for connecting the card to the devices inside personal computers, and the back connector 20 is also required for connecting the card to external wirings.

The front panel 12 and the back panel 14 are fixed to the frame 10 by, for example, thermocompression bonding. With reference to FIG. 6, the front panel 12 is constructed by forming an insulating layer 24 on an inwardly facing surface of a stainless steel plate 22 that is arranged to oppose the printed board 16, and by forming an adhesive layer 26 on the insulating layer 24. The back panel 14 is constructed in a similar manner. The front panel 12 and the back panel 14 are first aligned against the frame 10 in which the printed board 16 is disposed, and then the process of thermocompression bonding is performed. Accordingly, the front panel 12 and the back panel 14 are fixed to the frame 10. The insulating layer 24 insulates the electronic components and the electronic circuits on the printed board 16 from the front panel 12 and the back panel 14. In addition, the stainless steel plates are included in the front panel 12 and the back panel 14, and the grounded lines included in the printed board 16 are connected thereto. Accordingly, the mechanical strength of the PC card is ensured, and the electronic components and the electronic circuits are electromagneticaly shielded from the exterior of the PC card.

As described above, two panels (the front panel and the back panel) are used in the conventional PC card, and each panel includes a plate constructed of stainless steel or other metal having conductivity and rigidity, an insulating layer, and an adhesive layer. Thus, the construction is complex and the manufacturing cost is high. Accordingly, there are limits to reducing the number of components required for manufacturing the PC card, and to reducing the manufacturing cost.

To solve such problems, a method disclosed in Japanese Unexamined Patent Application Publication No. 6-320892 is useful, which will be referred to as a "published technique" in the following descriptions. In this published technique, a half of the frame that is located near the front panel is unitarily formed with the front panel, and the remaining half of the frame which is near the back panel is unitarily formed with the back panel. In addition, the front panel which is unitarily formed with the front half of the frame and the back panel which is unitarily formed with the back half of the frame are constructed of a resin. Accordingly, panels constructed of metal are not used. When this technique is applied to PC cards, the number of components and the manufacturing costs are reduced compared to the conventional technique described with reference to FIGS. 5 and 6.

In the above-described published technique, however, the shapes and the constructions of the front panel and the back panel are complex compared to the conventional technique, since each panel is unitarily formed to define a half of the frame. According to the published technique, two members (the front panel which is unitarily formed with the front half of the frame and the back panel which is unitarily formed with the back half of the frame) must be prepared, each of which has a complex shape and construction. Thus, in the case in which the published technique is applied to a PC card, there is another limit to reducing the cost and difficulty of manufacturing the case.

In addition, since the front panel and the back panel are constructed of a resin, the structural strength is reduced and the electromagnetic shielding ability is degraded compared to the conventional technique, in which the front and the back panels are constructed of a metal. To increase the structural strength, the front and the back panels of the published technique are provided with plate-shaped projections on the surfaces that are arranged opposite to the printed board, so as to provide reinforcing members. However, such reinforcing members increase the complexity of the shapes and the manufacturing steps of the front and the back panels, and the reduction of the manufacturing cost is further impeded.

In addition, in the conventional technique shown in FIGS. 5 and 6, the front and the back panels constructed of a metal are adhered on the frame constructed of a resin. Thus, a material which is capable of fixing the metal and the resin is used for forming the adhesive layer 26. In contrast, in the published technique, the front and the back panels are both constructed of a resin, and a double-sided adhesive tape is applied for fixing the front and the back panels to each other.

Accordingly, when a manufacturer introduces the published technique in place of the conventional technique shown in FIGS. 5 and 6, the adhering method and the adhesive must also be changed. Thus, additional expenses for technological development and for obtaining manufacturing know-how is required.

SUMMARY OF THE INVENTION

In order to overcome the problems described above, preferred embodiments of the present invention provide an information card and a card shaped casing therefor which require few components, which are developed and manufactured at low cost, and in which the structural strength is sufficient and electromagnetic shielding is ensured.

To this end, a card shaped casing of a preferred embodiment of the present invention preferably includes a panel-combined frame having a frame portion and a panel portion, the frame portion defining side surfaces of an information card, the panel portion defining the front surface or the back surface of the information card, and a separate panel which is arranged to oppose the panel portion of the panel-combined frame across the frame portion of the panel-combined frame, and which defines the back surface or the front surface of the information card, and electronic components or electronic circuits are disposed in a space surrounded by the panel-combined frame and the separate panel.

An information card according to another preferred embodiment of the present invention preferably includes the above-described card shaped casing and a board on which the above-described electronic components and the electronic circuits are mounted.

Since the panel-combined frame is used, in which a frame and one of front and back panels define a unitary, integral member, the number of panels is reduced compared to the conventional technique shown in FIGS. 5 and 6, so that the cost is reduced. The construction of the panel-combined frame is more involved compared to the panels used in. the conventional technique shown in FIGS. 5 and 6. However, only one panel-combined frame is necessary, so that the card shaped casing of preferred embodiments of the present invention is manufactured at a lower cost compared to the published technique, in which two panels having complex shapes and constructions are used.

The panel-combined frame and the separate panel may both be constructed of a metal. In such a case, the structural strength is increased and the electromagnetic shielding ability is greatly improved compared to the published technique.

The construction of the card shaped casing may be such that one of the panel-combined frame and the separate panel is constructed of a resin, and the other one of the panel-combined frame and the separate panel is constructed of metal. Also in this case, the structural strength is increased and the electromagnetic shielding ability is improved compared to the published technique. In addition, the panel-combined frame and the separate panel can be adhered to each other by the same method as that used in the conventional technique shown in FIGS. 5 and 6 for adhering the frame and the panels to each other. Accordingly, development cost is also reduced. The number of places to be adhered is reduced, so that mechanical strength is stabilized, and cost is further reduced. One of the panel-combined frame and the separate panel which is constructed of a resin may be covered with a layer which functions as an electromagnetic shield. In such a case, the ability to electromagnetically shield the electronic components and the electronic circuits disposed in the card shaped casing from the exterior of the card shaped casing is greatly improved. The layer which functions as an electromagnetic shield may also be provided on a board disposed in the card shaped casing on a surface which is opposite to the panel-combined frame and the separate panel which is constructed of a resin. Also in this case, the ability to electromagnetically shield the electronic components and the electronic circuits disposed in the card shaped casing from the exterior of the card shaped casing is greatly improved. In addition, when one of the panel-combined frame and the separate panel is constructed of a resin, it is possible to manufacture colored or colorless, transparent or translucent, panel-combined frames and separately formed panels, in accordance with a material of resin or a manufacturing condition. In addition, one of the panel-combined frame and the separate panel which is constructed of a metal may be used as a conductor for achieving the ground connection between the electronic components and the electronic circuits disposed inside the card shaped casing and the exterior of the card shaped casing. In such a case, the number of components is further reduced.

According to another preferred embodiment of the present invention, a card shaped casing preferably includes a frame having a flat shape which defines side surfaces of an information card, and a front panel and a back panel which respectively define the front surface and the back surface of the information card, and which oppose each other across the frame, and one of the front panel and the back panel is constructed of a resin and the other one of the front panel and the back panel is constructed of a metal, and electronic components and electronic circuits are disposed in a space surrounded by the frame, the front panel, and the back panel. When one of the front panel and the back panel is constructed of a resin as described above, the card shaped casing having an excellent structural strength compared to the published technique is achieved.

Other features, elements, arrangements, characteristics and advantages of the present invention will become more apparent from the detailed description of preferred embodiments of the present invention with reference to the attached drawings.

DETAILED DESCRIPTION OF PREFERRED EMBODIMENTS

Preferred embodiments of the present invention will be described below in conjunction with the accompanying drawings. In the following preferred embodiments, components which correspond to those shown in FIGS. 5 and 6 are denoted with the same reference numerals, and redundant explanations are thus omitted.

Figure 1A:
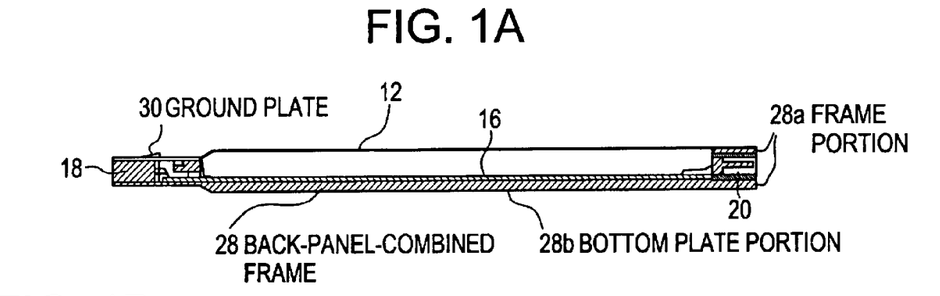
FIG. 1A is a sectional view of FIG. 1B which is cut along line B—B of a PC card according to a first preferred embodiment of the present invention.
Figure 1B:
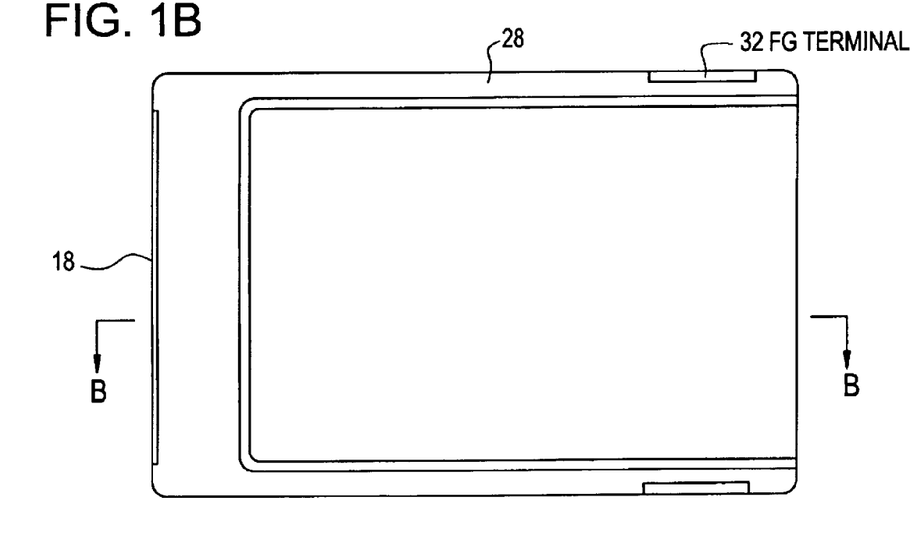
FIG. 1B is a bottom view of the PC card shown in FIG. 1A.

FIGS. 1A and 1B show a construction of a PC card according to a first preferred embodiment of the present invention, particularly a construction of a card shaped casing thereof. In the first preferred embodiment, the card shaped casing is preferably constructed of a back-panel-combined frame 28 and the front panel 12. The back-panel-combined frame 28 has a construction such that the frame 10 and the back panel 14 of the conventional technique, which are shown in FIGS. 5 and 6, are unified to define a single unitary integral member. The back-panel-combined frame 28 has the shape of a flat frame with a bottom plate, and is arranged in a manner such that a bottom plate portion 28b thereof is substantially parallel to the front panel 12. The thickness of the casing is mostly determined by dimensions of a frame portion 28a of the back-panel-combined frame 28. The back-panel-combined frame 28 may be constructed of a resin, a magnesium alloy, or other suitable material, by using techniques of die-casting, metal forming, or other suitable processes. On the other hand, the front panel 12, which is separately formed and constitutes the separate panel, may have the same construction as in the conventional technique shown in FIGS. 5 and 6. Other constructions, however, are also possible. In consideration of the desired electromagnetic shielding and the structural strength, the front panel 12 is preferably constructed of a metal. When the front panel 12 has a multi-layered construction as shown in FIG. 6 or a similar construction, at least one of the layers is preferably constructed of a metal.

The printed board 16, on which the electronic components are mounted or electronic circuits are provided, is disposed in a recess formed in the back-panel-combined frame 28. The front panel 12 is disposed so as to cover the opening of this recess, and is fixed to the back-panel-combined frame 28. When the back-panel-combined frame 28 is constructed of a resin and the front panel 12 is constructed as shown in FIG. 6, the back-panel-combined frame 28 and the front panel 12 may be fixed to each other by thermocompression bonding. Similar to the conventional technique, the front connector 18 and the back connector 20 are also provided in a frame portion 28a of the back-panel-combined frame 28. In addition, FG terminals 32 are also provided in the frame portion 28a. In memory cards, and other types of cards, the back connector 20 may be omitted. As shown in FIGS. 1A and 1B, ground plates 30 are electrically connected to patterns on the printed board 16 which have a predetermined potential (ground potential). In a PC card exclusively for 16 bit bus applications, the ground plates 30 may be omitted. The ground plates 30 and the FG terminals 32 may be unitary with the front panel 12. In such a case, the number of components and the cost are further reduced.

In the conventional technique, two metal panels, the front panel 12 and the back panel 14, are used. In contrast, only one metal panel, the front panel 12, is used in the first preferred embodiment of the present invention. Accordingly, the number of components is reduced, and the cost is also reduced by an amount corresponding to one metal panel. The metal panel shown in FIG. 6 is constructed of three layers, and is therefore expensive. Thus, the cost saved by omitting one of the plates shown in FIG. 6 is relatively high. In addition, although the shape and the construction of the back-panel-combined frame 28 are complex compared to the frame 10 in the conventional technique, only one back-panel-combined frame 28 is required. Thus, compared to the published technique, which requires two resin plates of which the shapes and the constructions are also complex, the PC card of the first preferred embodiment of the present invention may be manufactured at a lower cost. In addition, the front panel 12 (and/or the back-panel-combined frame 28) of the first preferred embodiment is preferably constructed of a metal. Accordingly, the PC card of the first preferred embodiment has superior electromagnetic shielding ability, and has sufficient structural strength compared to the published technique in which both the front and the back plates are constructed of a resin. In addition, it is not necessary to provide reinforcing members. In the case in which the back-panel-combined frame 28 is constructed of a resin, the front panel 12 and the back-panel-combined frame 28 may be fixed to each other by using the same adhesive and technique as in the conventional technique for fixing the panels and the frame. In addition, since the number of locations of fixing or adhering is reduced, mechanical strength is stabilized, and the cost is further reduced.

Figures 2A, 2B:
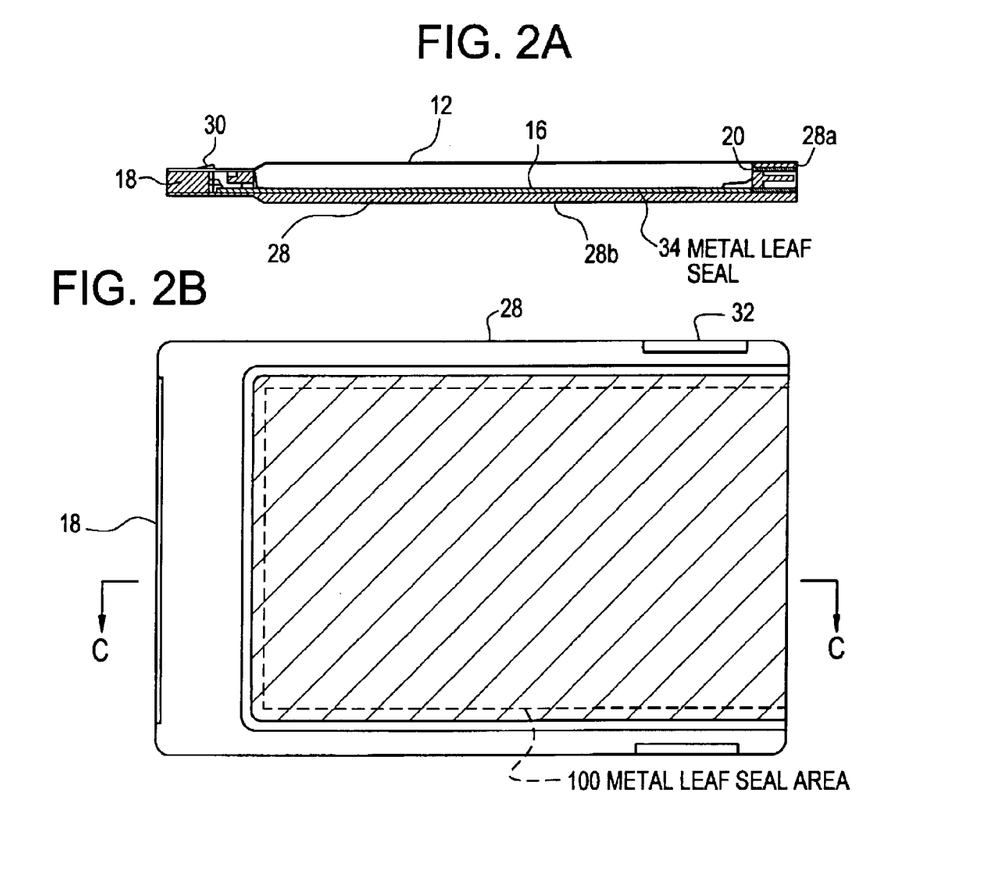
FIG. 2A is a sectional view of FIG. 2B which is cut along line C—C of a PC card according to a second preferred embodiment of the present invention.
FIG. 2B is a bottom view of the PC card shown in FIG. 2A.
Figure 3:
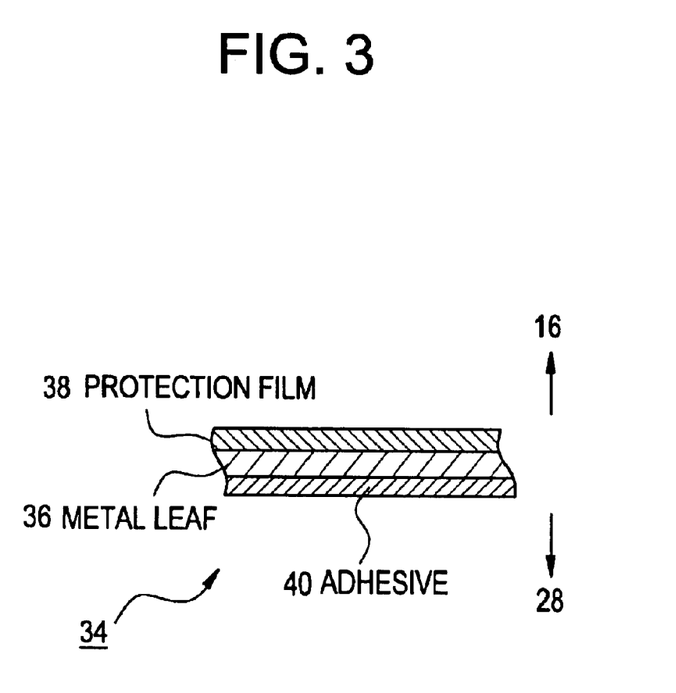
FIG. 3 is a sectional view showing a construction of a metal leaf seal.

FIGS. 2A, 2B, and 3 show a construction of a PC card according to a second preferred embodiment of the present invention, particularly a construction of a card shaped casing thereof. In the second preferred embodiment, a metal leaf seal 34 is adhered on the inwardly facing surface of the back-panel-combined frame 28, so that the metal leaf seal 34 is disposed between the printed board 16 and the back-panel-combined frame 28. With reference to FIG. 2B, the metal leaf seal 34 is applied over a metal leaf seal area 100, which is the area surrounded by the dashed line. As shown in FIG. 3, the metal leaf seal 34 is preferably constructed by forming a protection film 38 on one side of a metal leaf 36, and by forming an adhesive 40 on the other side thereof. In a laminating process, the metal leaf seal 34 is first disposed on the back-panel-combined frame 28 such that the adhesive 40 opposes the back-panel-combined frame 28. Then, pressure or heat is applied to the metal leaf seal 34 from the side on which the protection film 38 is located. The metal leaf seal 34 functions as both a covering layer and a electromagnetic shield. Accordingly, even when the back-panel-combined frame 28 is constructed of a resin, the electromagnetic shielding is ensured. In addition, by forming the protection film 38 with an insulating material, conductors disposed on the surface of the printed board 16 which oppose the metal leaf seal 34 are prevented from electrically contacting the metal leaf 36.

Although the use of the metal leaf seal 34 increases the number of components and the cost, the metal leaf seal 34 can be manufactured or purchased at a relatively low cost. Accordingly, the casing of the second preferred embodiment is still realized at a lower cost compared to the conventional technique in which an expensive back panel 14 is used. In addition, the electromagnetic shielding ability is improved compared to the published technique in which both the front and the back panels are constructed of a resin, and to the first preferred embodiment in which the back-panel-combined frame 28 is constructed of a resin. The protection film 38 may be laminated on the entire surface of the metal leaf 36. However, a portion of the metal leaf 36 which opposes the back connector 20 may also be exposed. In such a case, a metal shell constructing the back connector 20 contacts the uncovered part of the metal leaf 36 when the metal leaf seal 34 is laminated on the back-panel-combined frame 28. Accordingly, an electric potential of the metal leaf 36 is set to a predetermined potential in the printed board 16, for example, the ground potential. Instead of or in addition to adhering the metal leaf seal 34 on the back-panel-combined frame 28, an electromagnetic interference (EMI) controlled board, of which the back surface is covered by a conductive material such as copper, or other suitable material, may also be used as the printed board 16. Also in this case, the cost is reduced and the electromagnetic shielding ability is increased.

Figure 4A:
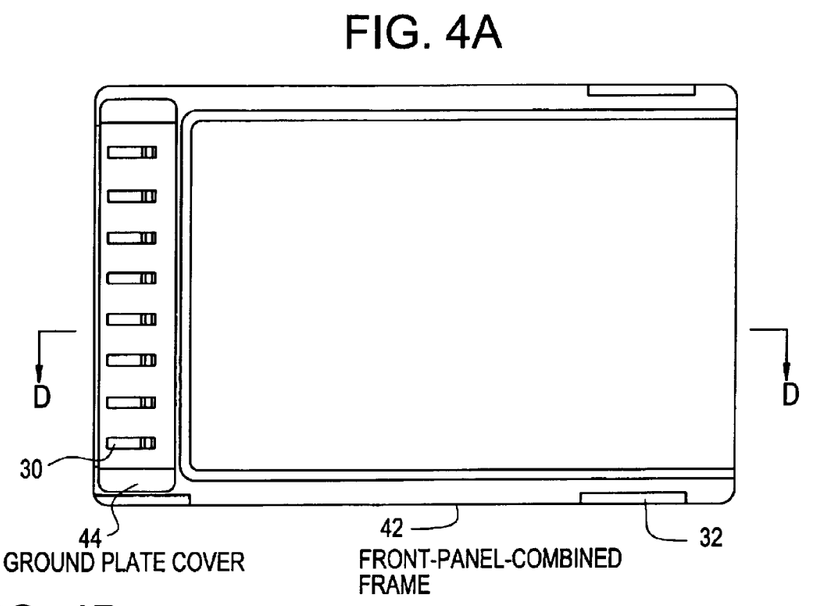
FIG. 4A is a top view of a PC card according to a third preferred embodiment of the present invention.
Figure 4B:
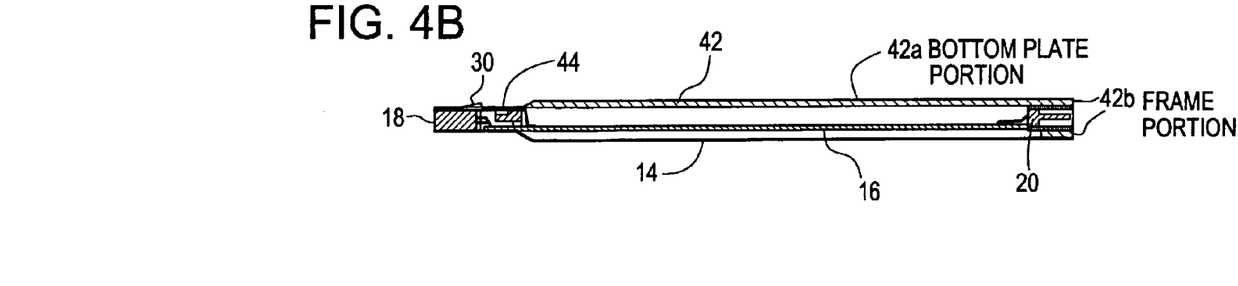
FIG. 4B is a sectional view of FIG. 4A which is cut along line D—D.

FIGS. 4A and 4B show a construction of a PC card according to a third preferred embodiment of the present invention, particularly a construction of a card shaped casing thereof. The card shaped casing of the third preferred embodiment preferably includes a front-panel-combined frame 42 and the back panel 14. The front-panel-combined frame 42 includes a frame portion 42b, by which the thickness of the card shaped casing is mostly determined. In addition, the front connector 18 and the back connector 20 are disposed in the frame portion 42b. The front-panel-combined frame 42 is arranged in a manner such that the bottom surface 42a thereof is substantially parallel to the back panel 14, which is separately formed. Similar to the back-panel-combined frame 28 described in the first and the second preferred embodiments, the front-panel-combined frame 42 may also be constructed of a resin, a magnesium alloy, or other suitable material. In addition, the metal leaf seal 34 may also be laminated thereon. Although the thickness of the front-panel-combined frame 42 is constant in FIG. 4B, the thickness may be partially changed in order to avoid the connection between the front-panel-combined frame 42 and the electric components mounted on the printed board 16. The back panel 14 may have the construction shown in FIG. 6. As shown in FIG. 4B, the printed board 16 is preferably disposed and is held in a manner such that the back panel 14 and the printed board 16 do not contact each other. However, when an insulating layer is formed on the inwardly facing surface of the back panel 14 which opposes the printed board 16, the printed board 16 may also be disposed in a manner such that the back panel 14 and the printed board 16 contact each other.

The effects obtained by the first preferred embodiment are also obtained by the above-described construction. In addition, when the electromagnetic shielding ability is provided to the front-panel-combined frame 42 by, for example, adhering the metal leaf seal 34 thereon, the effects obtained by the second preferred embodiment are also obtained. In addition, when the front-panel-combined frame 42 is constructed of a resin, colored or colorless, transparent or translucent front-panel-combined frame 42 may be obtained. Accordingly, a see-through PC card having an attractive appearance is realized at a low cost with the present preferred embodiment. In addition, the PC card shown in FIGS. 4A and 4B requires ground plates 30, and a ground plate cover 44 is provided for protecting spring portions of the ground plates 30. Even though the number of components and the cost are increased due to this ground plate cover 44, the fourth preferred embodiment is still realized at lower cost compared to the case in which the front panel 12 shown in FIG. 6 is used.

The PC cards according to the preferred embodiments of the present invention were described in the foregoing descriptions. The present invention may be applied to any type of PC card and to any card shaped casing therefor, irrespective of specifications and standards which the PC cards and the card shaped casings must meet. In addition, the present invention may also be applied to information cards other than PC cards and the card shaped casings therefor. In the present descriptions, "information card" refers to a card type unit that contains electronic components or electronic circuits, and which electrically, magnetically, or optically processes and stores information. Thus, the use of the information cards is not limited to inputting and outputting information to/from computers, nor is it limited to storing information.

While the present invention has particularly shown and described with reference to the preferred embodiments thereof, it will be understood by those skilled in the art that the foregoing and other changes in form and details can be made therein without departing from the spirit and scope of the invention.

What is claimed is:

1. A card shaped casing comprising:
   a panel-combined frame having a frame portion and a panel portion, the frame portion defining side surfaces of an information card, the panel portion defining one of the front surface and the back surface of the information card; and
   a separate panel arranged to oppose the panel portion of the panel-combined frame across the frame portion of the panel-combined frame, and the separate panel being arranged to define the other of the back surface and the front surface of the information card;
   wherein one of electronic components and electronic circuits are disposed in a space surrounded by the panel-combined frame and the separate panel; and
   said panel-combined frame is defined by a single structural element which is made of a single material.

2. A card shaped casing according to claim 1, wherein the panel-combined frame is a back panel combined frame having a flat frame with a bottom plate portion.

3. A card shaped casing according to claim 2, wherein a printed circuit board including the one of the electronic components and the electronic circuits mounted thereon is disposed in a recess formed in the back-panel-combined frame.

4. A card shaped casing according to claim 3, wherein the separate panel is a front panel that is arranged to cover the opening of the recess.

5. A card shaped casing according to claim 2, further comprising a metal leaf seal adhered on the inwardly facing surface of the back-panel-combined frame.

6. A card shaped casing according to claim 5, wherein the metal leaf includes a protection film and an adhesive, and defines an electromagnetic shield.

7. A card shaped casing according to claim 1, wherein the panel-combined frame is a front panel combined frame having a flat frame portion, and including a front connector and a back connector.

8. A card shaped casing according to claim 7, wherein the separate panel is a back panel that is joined to the front panel combined frame.

9. A card shaped casing according to claim 1, wherein the panel-combined frame and the separate panel are made of metal.

10. A card shaped casing according to claim 9, wherein one of the panel-combined frame and the separate panel that is made of metal defines a conductor for achieving a ground connection between the one of the electronic components and the electronic circuits disposed inside the card shaped casing and the exterior of the card shaped casing.

11. A card shaped casing according to claim 1, wherein one of the panel-combined frame and the separate panel is made of resin, and the other one of the panel-combined frame and the separate panel is made of metal.

12. A card shaped casing according to claim 11, wherein the one of the panel-combined frame and the separate panel that is made of resin is covered with a covering layer that defines an electromagnetic shield.

13. A card shaped casing according to claim 11, wherein one of the panel-combined frame and the separate panel that is made of resin is one of colored, colorless and transparent, and translucent.

14. A card shaped casing according to claim 11, wherein one of the panel-combined frame and the separate panel that is made of metal defines a conductor for achieving a ground connection between the one of the electronic components and the electronic circuits disposed inside the card shaped casing and the exterior of the card shaped casing.

15. A card shaped casing according to claim 11, wherein the panel-combined frame is made of metal.

16. An information card according to claim 11, wherein the information card is a personal computer card.

17. An information card comprising a card shaped casing according to claim 11 and a board on which the one of the electronic components and the electronic circuits are mounted is covered with a layer which defines an electromagnetic shield, wherein the layer faces one of the panel-combined frame and the separate panel made of resin.

18. An information card according to claim 17, wherein the information card is a personal computer card.

19. An information card comprising a card shaped casing according to claim 1 and a board on which the one of the electronic components and the electronic circuits is mounted.

* * * * *